US008467384B2

(12) United States Patent
McMenamy

(10) Patent No.: US 8,467,384 B2
(45) Date of Patent: Jun. 18, 2013

(54) METHOD AND SYSTEM FOR CALL PROCESSING

(75) Inventor: Kevin R. McMenamy, Yuba City, CA (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 13/300,229

(22) Filed: Nov. 18, 2011

(65) Prior Publication Data

US 2012/0063320 A1  Mar. 15, 2012

Related U.S. Application Data

(63) Continuation of application No. 11/172,102, filed on Jun. 30, 2005, now Pat. No. 8,064,439.

(51) Int. Cl.
*H04L 12/66* (2006.01)

(52) U.S. Cl.
USPC .......................... 370/356; 370/351; 370/352

(58) Field of Classification Search
USPC ........................................ 370/356, 351, 352
See application file for complete search history.

(56) References Cited

U.S. PATENT DOCUMENTS

| 6,128,298 | A | 10/2000 | Wootton et al. ............... 370/392 |
| 6,363,065 | B1 | 3/2002 | Thornton et al. ............. 370/352 |
| 6,373,857 | B1 | 4/2002 | Ma ................................ 370/475 |
| 6,374,302 | B1 | 4/2002 | Galasso et al. ................ 709/238 |
| 6,426,955 | B1 | 7/2002 | Gossett Dalton et al. .... 370/401 |
| 6,466,571 | B1 | 10/2002 | Dynarski et al. .............. 370/352 |
| 6,519,242 | B1 | 2/2003 | Emery et al. .................. 370/338 |
| 6,687,252 | B1 | 2/2004 | Bertrand et al. .............. 370/401 |
| 6,707,797 | B1 | 3/2004 | Gardell et al. ................ 370/260 |
| 2001/0043608 | A1 | 11/2001 | Potter et al. ................... 370/401 |
| 2002/0026515 | A1 | 2/2002 | Michielsens et al. ......... 709/227 |
| 2003/0054841 | A1 | 3/2003 | Griswold et al. ............. 455/460 |
| 2004/0142697 | A1 | 7/2004 | Knaebchen et al. ....... 455/452.1 |
| 2004/0190442 | A1 | 9/2004 | Lee ............................... 370/401 |
| 2005/0105543 | A1 | 5/2005 | Ikenaga et al. ................ 370/428 |

OTHER PUBLICATIONS

"Notification of Transmittal of the International Search Report and the Written Opinion of the International Searching Authority, or the Declaration," Int'l Application No. PCT/US2006/019230, Mailed Oct. 25, 2006, Int'l filing date: May 17, 2006; 14 pgs.
Cisco Systems, Inc., Cisco Gatekeeper Internal Interface Reference, Version 4.1, Aug. 2002, XP-002402618, 34 pages.
European Patent Office, Germany, Communication pursuant to Article 94(3) EPC regarding application No. 06 760 089.0-2413, Ref. P30446EP-PCT, dated Jul. 12, 2012.

*Primary Examiner* — Ahmad Matar
*Assistant Examiner* — Jirapon Intavong
(74) *Attorney, Agent, or Firm* — Baker Botts L.L.P.

(57) ABSTRACT

According to one embodiment of the invention, a method includes receiving a first setup message transmitted by a first endpoint, the first setup message an attempt by the first endpoint to setup a call with a second endpoint, the setup message sent by the first endpoint to an IP address of a call manager after the first endpoint registered with a gatekeeper, the IP address of the call manager supplied to the first endpoint by the gatekeeper in response to a request by the first endpoint to the gatekeeper for an IP address of the second endpoint. The method further includes attempting to setup the call between the first and second endpoints by transmitting a second setup message to the second endpoint.

19 Claims, 2 Drawing Sheets

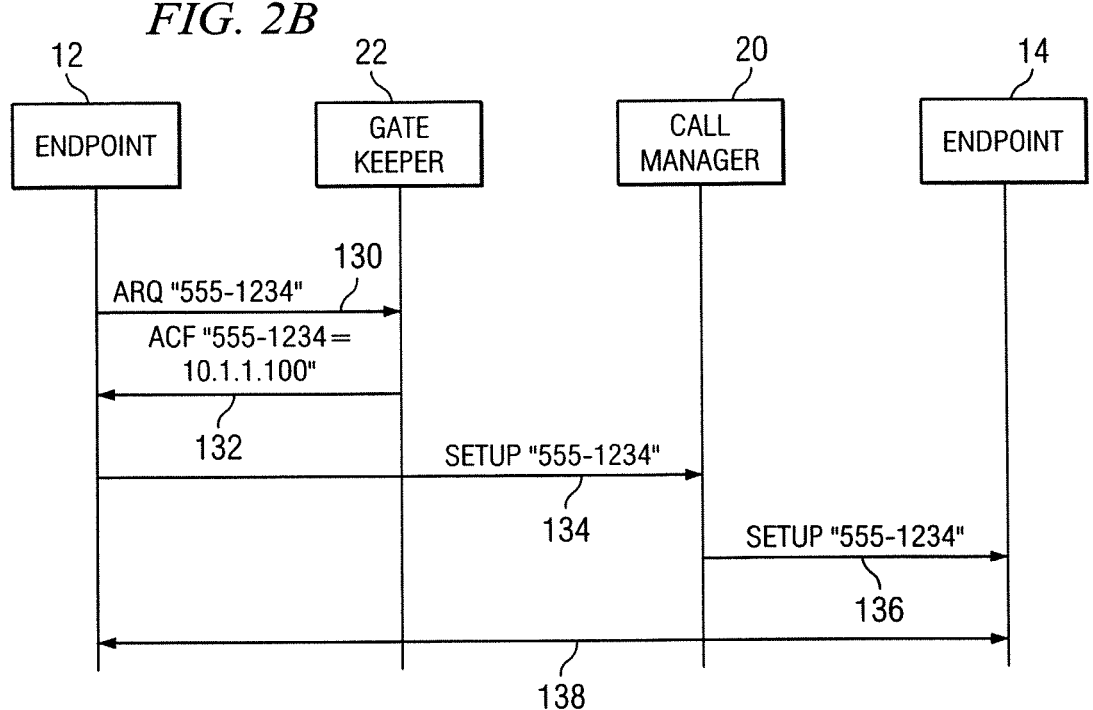
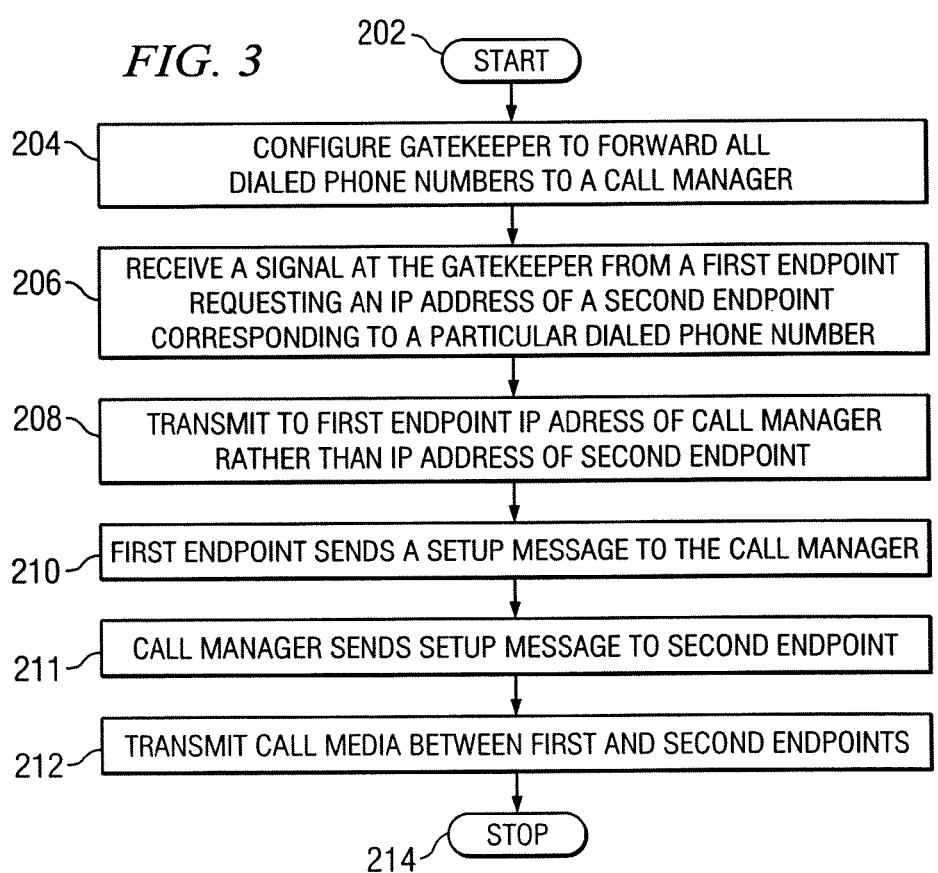

METHOD AND SYSTEM FOR CALL PROCESSING

CROSS-REFERENCE TO RELATED APPLICATION

This application is a continuation of U.S. application Ser. No. 11/172,102 filed Jun. 30, 2005 and entitled "Method and System for Call Processing".

TECHNICAL FIELD OF THE INVENTION

This invention relates generally to communications and more particularly to a method and system for call processing, which in a specific embodiment involves a method for routing calls in an IP video telephony environment.

BACKGROUND OF THE INVENTION

Communications is becoming increasingly important in today's society. In particular, video conferencing has become commonplace and an alternative to business travel. The proliferation of the internet has enhanced video conferencing capability, with IP video telephony becoming commonplace.

In one IP telephony example, two endpoints, such as IP video telephones, communicate with each other through the use of a gatekeeper. One example of a gatekeeper is a Cisco router running Cisco IOS software. In one example implementation, both endpoints register with the gatekeeper. Then, when at first one of the endpoints wishes to communicate with another endpoint, the first endpoint sends the phone number of the other endpoint to the gatekeeper. The gatekeeper returns the IP address of the other endpoint. Using the received IP address, the endpoints can communicate with each other directly. Gatekeepers can also be used in communication contexts outside the IP video telephony environment, including transmitting data utilizing only audio media.

Although the use of gatekeepers to process calls is satisfactory for some purposes it is not entirely satisfactory in all respects.

SUMMARY OF THE INVENTION

According to one embodiment of the invention, a method of processing calls includes configuring a gatekeeper to forward all dialed phone numbers to a call manager. The method also includes receiving a signal at the gatekeeper from a first endpoint requesting an IP address of a second endpoint corresponding to a particular dialed phone number. In response, the gatekeeper transmits to the first endpoint an IP address of the call manager rather than the IP address of the second endpoint. The call manager is operable to set up a call between the first and second endpoints wherein the call does not travel through the call manager.

Some embodiments of the invention provide numerous technical advantages. Some, none, or all embodiments of the invention may benefit from the below described advantages. According to one embodiment of the invention, a method is provided that allows a gatekeeper to relinquish control of all calls to a call manager. Because the call manager is processing the calls, certain advanced call processing functionality may be utilized that is not traditionally available with gatekeepers. For example, the call manager may effect call permission routing, time of day routing, bandwidth control and called or calling number translation, allowing better control over which endpoints are allowed to call each other and how those calls are routed.

Other embodiments should be readily apparent to those skilled in the art.

BRIEF DESCRIPTION OF THE DRAWINGS

For a more complete understanding of the present invention and its advantages, references now made to the following description, taken in conjunction with the accompanying drawings, in which:

FIG. 3 is a flowchart illustrating a method for call processing according to the teachings of the invention.

DETAILED DESCRIPTION OF THE INVENTION

Figure 1:
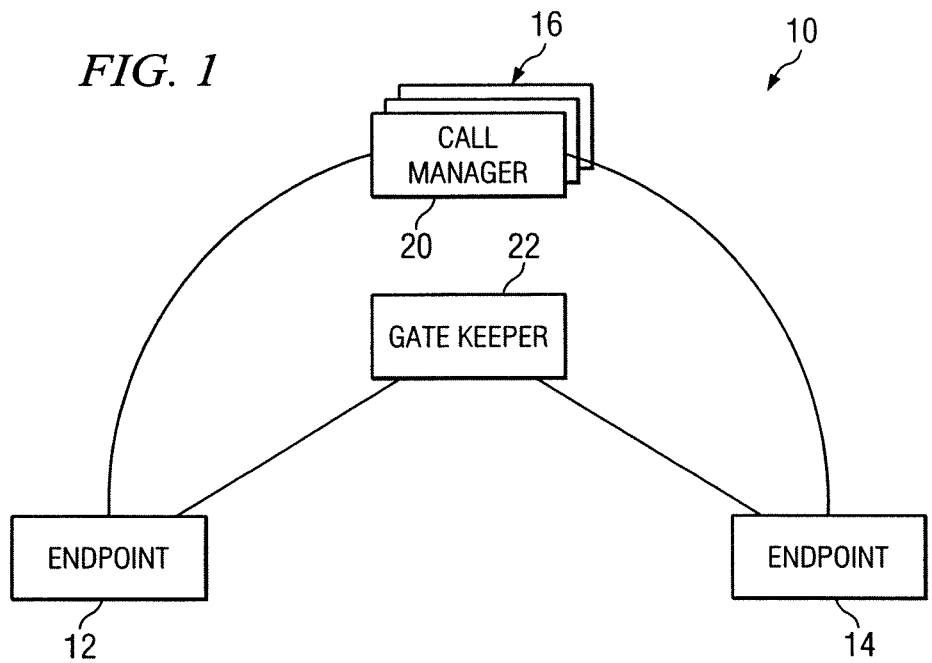
FIG. 1 is a block diagram illustrating a communication system according to the teachings of the invention.

Embodiments of the present invention and its advantages are best understood by referring to FIGS. 1 through 3 of the drawings, like numerals being used for like and corresponding parts of the various drawings.

FIG. 1 is a block diagram illustrating a communication system 10 according to the teachings of the invention. System 10 is a video conferencing communication system which is used to illustrate teachings of the invention; however, the teachings of the invention are also applicable outside the video conferencing context. Communication system 10 includes a first endpoint 12 and a second endpoint 14. In this example, endpoints 12 and 14 are video conferencing endpoints such as a video terminal with an associated IP telephone; however, as used herein endpoints refer to a device capable of transmitting or receiving a call, which may be a video call or an audio call.

Communication system 10 also includes a call manager cluster 16. Call manager cluster 16 includes a plurality of call managers 20. Call managers 20 are devices that perform a switching function to appropriately route calls. One example of a call manager is the Cisco CallManager which resides on the Cisco 7800 Media Convergence Server. Unlike gatekeepers, which are described below, a call manager can restrict the ability of one endpoint from reaching another, as well as provide additional enhanced functionality, in some embodiments. Networks relying on gatekeepers are traditionally hard to manage, difficult to employ, and lack certain administrative controls. Cisco CallManager augments the limitations of the gatekeeper, providing the administrator a greater degree of control over the network and how calls are routed; for instance, Cisco CallManager can restrict the ability from one endpoint to reach another, and includes the capability to implement call permissions (who is allowed to call whom), determine how a call is routed based on, for example, the time of day, and perform number translations, such as translation of a calling or called number.

Communication system 10 also includes a gatekeeper 22. As described in greater detail below, according to the invention, gatekeeper 22 directs all calls to one of the call managers 20 so that the call manager 20 may perform all call routing and bandwidth control. Gatekeeper 22 is a device that registers endpoints by receiving and correlating their IP addresses and associated phone numbers. Gatekeeper 22 provides an IP address of an endpoint 12, to endpoint 14 in response to receiving an endpoint's telephone number and a request to provide its IP address. One example of a gatekeeper is implemented in Cisco Access Routers, 2600 or 3600 having Cisco IOS software, including but not limited to series numbers 2600, 2800, 3600, 3700, 3800, and 7200; however, other routers may be used.

Conventionally videoconferencing networks relied on gatekeepers to perform all device registration management, call routing, and bandwidth control. One example of such a gatekeeper, the Cisco IOS Gatekeeper, (formerly known as the Multimedia Conference Manager), provided these functions. The teachings of the invention recognize that some call managers, such as Cisco CallManager Release 4.0, for example, provide vastly superior call routing and bandwidth controls than gatekeepers do, and therefore it is desirable to configure the H.323 devices in the network to route their calls through call manager 22.

Therefore, according to the teachings of the invention, all calls into gatekeeper 22 are redirected to call manager 20 for handling all call routing, allowing communication system 10 to benefit from the enhanced functionality provided by call manager 20. As an example, gatekeeper 22 generally does not have the capability to provide advanced functionality such as effecting calling permissions, time of day routing, and called or calling number translations. Thus by routing all calls through call manager 20 rather than routing by gatekeeper 22, this enhanced functionality and other enhanced functionality associated with call managers may be provided. Additional details are described below in conjunction with FIGS. 2A through 3.

Figure 2A:
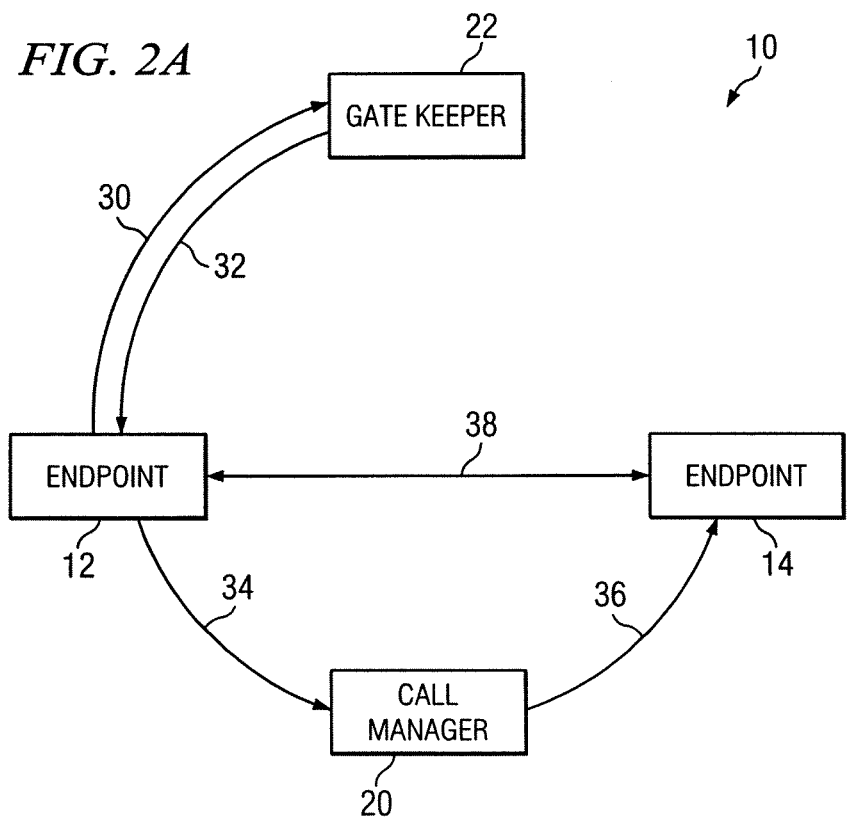
FIG. 2 is a block diagram illustrating portions of the system of FIG. 2A according to the teachings of the invention.
FIG. 2B is a call flow diagram illustrating a call flow according to the teachings of the invention.

FIG. 2A is a block diagram illustrating portions of communication system 10 according to the teachings of the invention. The operation of one embodiment of the invention is described with respect to FIG. 2A. When endpoint 12 desires to place a call to endpoint 14, it issues a request 30 to gatekeeper 22 for the IP address associated with endpoint 14. Endpoint 12 identifies endpoint 14 in message 30 by endpoint 14's telephone number. Conventionally, gatekeeper would respond with a message including the IP address of endpoint 14. However, according to the teachings of the invention, gatekeeper 22 responds with a message 32 that includes the IP address of call manager 20. Thus, endpoint 12 receives an IP address of call manager, believing it to be the IP address of endpoint 14.

In response, endpoint 12 sends a setup message 34 to call manager 20, believing the setup message is being sent to endpoint 14. In one embodiment, the setup message may include the calling party's (endpoint 12) telephone number as well as the called party's (endpoint 14) telephone number. Call manager 20 recognizes setup message 34 as an attempt to set up a message between endpoint 12 and endpoint 14. In response, call manager issues its own setup message 36 to endpoint 14. Setup message 36 may include the telephone number of the calling party (endpoint 12), and the telephone number of the called party (endpoint 14), or call manager 20 may manipulate one or both of these numbers so that the calling and/or called numbers appear differently to endpoint 14. Endpoint 14 receives the setup message 36 and may initiate a call 38 in which call media may be exchanged between endpoint 12 and endpoint 14. It is noted that the communication of call media between endpoints 12 and 14 may occur without that media flowing through call manager 20.

Because the call routing is performed by call manager 20, advanced functionality possessed by call manager 20 may be utilized in processing calls between endpoints 12 and 14, including calling permissions, time of day routing, least-cost routing, called and/or calling number translations and bandwidth controls.

In order for gatekeeper 22 to return message 32 having the IP address of call manager 20 rather than the IP address of endpoint 14, call manager must be configured to effect such a message. According to the teachings of the invention, gatekeeper 22 is configured to route all phone numbers received in message 30 to call manager 20. This is effected, in one embodiment, by routing all dialed numbers starting with the number 0 through 9 to call manager 20. Example details associated with one particular embodiment of such configuration are described in greater detail below.

According to one embodiment, the use of zone prefixes enables gatekeeper 22 to route calls to the correct zone, while technology prefixes enable gatekeeper 22 to route calls to the correct gateway device, which may be call manager 20. In one embodiment of gatekeeper 22, zones are used to group endpoint types to restrict them from dialing each other directly without going through call manager 20. Therefore, four zones may be created on gatekeeper 22. Those four zones include a client zone, a call manager zone, a gateway zone, and a Multipoint Control Unit (MCU) Zone (not explicitly shown). The client zone is a single zone for all the endpoints associated with a given call manager cluster 16. The call manager zone is a single zone for all the call manager servers in a cluster 16. The gateway zone is a single zone for all the H.320 gateways associated with a given call manager cluster 16, in one example. The MCU zone is a single zone for all the MCUs associated with a given call manager cluster 16. These zones enable configuration of the gatekeeper to block endpoints from calling MCUs and gateways directly and to block endpoints, MCUs and gateways from calling each other directly. Instead, all calls are routed to the call manager zone through the use of zone prefixes.

In one example, gatekeeper 22 is configured to route all calls to the call manager zone and then to the correct call manager within that zone. In one embodiment, all calls are routed to the call manager zone by configuring ten zone prefixes (0 through 9) for that zone, as illustrated in the following example:

zone prefix [callmanager_zone] 0*
zone prefix [callmanager_zone] 1*
zone prefix [callmanager_zone] 2*
zone prefix [callmanager_zone] 3*
zone prefix [callmanager_zone] 4*
zone prefix [callmanager_zone] 5*
zone prefix [callmanager_zone] 6*
zone prefix [callmanager_zone] 7*
zone prefix [callmanager_zone] 8*
zone prefix [callmanager_zone] 9*

With the zone prefixes defined in this way, no matter what number an endpoint dials, the call will always be routed to call manager 20.

In specific implementations involving the use of a Cisco CallManager as call manager 20, the H.225 gatekeeper-controlled trunk in Cisco CallManager is configured to register in the CallManager Zone. This trunk registers with a technology prefix, and in one example that technology prefix is 1#. It is desirable in this specific implementation that this technology prefix is configured to be the default technology prefix in gatekeeper 22. The following command may be used to configure the technology prefix in gatekeeper 22.

gw-type-prefix 1# default-technology

When gatekeeper 22 matches the dialed number to a zone prefix, it then looks inside that zone to find a matching E.164 address. In one implementation, there will be no E.164 addresses registered in the CallManager Zone, so gatekeeper 22 will default to routing the call to a gateway that is registered with the default technology prefix in that zone, which in this case will be Cisco CallManager.

In the specific example described above, when gatekeeper 22 routes a call to the H.225 trunk of Cisco CallManager 20, Cisco CallManager 20 looks at the source IP address of the calling endpoint 12 and tries to match that address to a device in its database. If it finds a matching IP address, Cisco CallManager 20 applies that device's calling permissions and other relevant settings. If it does not find a match, Cisco CallManager 20 may apply the calling permissions and other relevant settings of the trunk, or may reject the call altogether.

For devices configured as H.323 gateways in Cisco CallManager 20 (for example, H.320 gateways and MCUs would be configured as H.323 gateway devices), the H.225 handler representing that device in Cisco CallManager 20 may register with every Cisco CallManager 20 server in the Cisco CallManager 16 redundancy group defined for that device. For H.323 clients, the H.225 handler representing these devices registers with only the primary Cisco CallManager 20 server for that client's Cisco CallManager group 16 (FIG. 1). Therefore, gatekeeper 22 may be configured to always route calls to the primary server 20. If the primary server 20 goes down and unregisters from gatekeeper 22, gatekeeper 22 should then route all calls to the secondary server 20, and so on.

To configure gatekeeper 22 to prioritize the routing of calls to the various Cisco CallManagers 20 servers in the cluster 16, the gw-priority argument may be used at the end of the zone prefix command, as illustrated in the following example:

```
zone prefix [callmanager_zone] 0* gw-priority 10    [callmanager-1]
zone prefix [callmanager_zone] 0* gw-priority 9     [callmanager-2]
zone prefix [callmanager_zone] 0* gw-priority 8     [callmanager-3]
zone prefix [callmanager_zone] 1* gw-priority 10    [callmanager-1]
zone prefix [callmanager_zone] 1* gw-priority 9     [callmanager-2]
zone prefix [callmanager_zone] 1* gw-priority 8     [callmanager-3]
zone prefix [callmanager_zone] 2* gw-priority 10    [callmanager-1]
zone prefix [callmanager_zone] 2* gw-priority 9     [callmanager-2]
zone prefix [callmanager_zone] 2* gw-priority 8     [callmanager-3]
...
zone prefix [callmanager_zone] 9* gw-priority 10    [callmanager-1]
zone prefix [callmanager_zone] 9* gw-priority 9     [callmanager-2]
zone prefix [callmanager_zone] 9* gw-priority 8     [callmanager-3]
```

To configure the correct zones for the endpoints 12, 14, the zone subnet command may be used in gatekeeper 22 to define which IP addresses or IP address ranges are permitted to register in each zone. Either a particular host address or a subnet of addresses may be specified. For Cisco CallManager, gateway, and MCU zones, the specific host addresses may be used, for example, as illustrated in the following example:

```
no zone subnet [callmanager_zone] default enable
zone subnet [callmanager_zone] 10.1.1.101/32 enable
zone subnet [callmanager_zone] 10.1.1.102/32 enable
zone subnet [callmanager_zone] 10.1.1.103/32 enable
!
no zone subnet [mcu_zone] default enable
zone subnet [mcu_zone] 10.1.1.201/32 enable
!
no zone subnet [gateway_zone] default enable
zone subnet [gateway_zone] 10.1.1.301/32 enable
zone subnet [gateway_zone] 10.1.1.302/32 enable
```

For the client zone, the IP addresses of the endpoints do not need to be explicitly allowed. Instead, the IP addresses of all the Cisco CallManagers, MCUs, and gateways can be denied, with the default enable command to allow all other address ranges in that zone. For example:

```
zone subnet [client_zone] default enable
no zone subnet [client_zone] 10.1.1.101/32 enable
no zone subnet [client_zone] 10.1.1.102/32 enable
no zone subnet [client_zone] 10.1.1.103/32 enable
no zone subnet [client_zone] 10.1.1.201/32 enable
no zone subnet [client_zone] 10.1.1.301/32 enable
no zone subnet [client_zone] 10.1.1.302/32 enable
```

In the particular example of the Cisco CallManager Release 4.0 for use as call manager 20, the static IP addresses for all H.323 clients, MCUs, and gateways may be used in order to define them in Cisco CallManager Administration.

In a particular implementation involving the Cisco IOS Gatekeeper, it is noted that the Cisco IOS Gatekeeper previously offered an H.323 Proxy function as part of the Multimedia Conference Manager (MCM) feature set. The MCM Proxy is not compatible with Cisco CallManager and is therefore disabled, in one embodiment. The Cisco IOS Gatekeeper, by default, is configured to use the MCM Proxy for inter-zone calls to and from H.323 clients. In other words, when a local zone is created on the Cisco IOS Gatekeeper, its default configuration is:
use-proxy <zone_name> default [inbound-to|outbound-from] terminals Although particular examples of configuration of one example gatekeeper have been described, it should be understood that various changes, substitutions, and alterations can be made therein without departing from the spirit and scope of the present invention as defined by the appended claims.

FIG. 2B is a call flow diagram illustrating the call flow for the example of FIG. 2A. FIG. 2B includes endpoints 12 and 14, gatekeeper 22, and call manager 20. At a step 130 endpoint 12 sends a request to gatekeeper 22 for the IP address associated with endpoint 14. In one example implementation, message 30 is an admission request that includes the telephone number of endpoint 14. In response, at step 132 gatekeeper 22 sends a message 32 to endpoint 12 with the IP address of call manager 20, rather than the IP address of endpoint 14. In one example implementation this is effected by gatekeeper 22 issuing an admission confirmation message, as illustrated.

At step 134, endpoint 12 issues a setup message 34 trying to set up a call with endpoint 14. In addition to the calling party's (endpoint 12) telephone number, setup message may also include the called party's (endpoint 14) telephone number as well as additional data. As described above, message 34 is transmitted to call manager 20, because endpoint 12 received the call manager 20's IP address as being associated with the called party's telephone number rather than the IP address of endpoint 14. At step 136 a setup message is transmitted from call manager 20 to endpoint 14 that includes the calling party's (endpoint 12) number as well as the called party's (endpoint 14) telephone number. It is noted that at this point call manager 20 may implement routing logic, such as determining whether endpoint 12 has permission to call endpoint 14, as well as number translations and other routing logic. Thus, enhanced functionality associated with call routing that is normally available when call managers are used is available even in the context in which endpoints register with a gatekeeper. At step 138, endpoint 14 responds to the request initiated by endpoint 12 to set up a call and may exchange call media with endpoint 12, without transmitting the call media through call manager 20.

FIG. 3 is a flowchart illustrating a method 200 for call processing according to the teachings of the invention. The method begins at step 202. At step 204 a gatekeeper is configured to forward all calls to a call manager. In one example, this configuration may include configuring the gatekeeper to forward all phone numbers that begin with the dialed number 0 through 9 to the call manager. Example details for implementing such configuration are described above. At a step 206, a signal is received at the gatekeeper from a first endpoint requesting an IP address of a second endpoint corresponding to a particular dialed phone number. In response, at step 208, a message is transmitted to the first endpoint that returns the IP address of a call manager rather than the IP address of the second endpoint. This returning of the IP address of the call manager rather than the IP address of the second endpoint effects transfer of call routing to the call manager rather than the gatekeeper, effectively relinquishing control of the call to the call manager.

At step 210, the first endpoint sends a setup message to the call manager thinking it is sending the setup message to the second endpoint attempting to set up a call. As described above, such a setup message may include the phone number of both the called and calling parties, as well as additional information. In response to receiving the first setup message, the call manager sends a setup message at step 211 to the second endpoint attempting to set up a call between the first endpoint and the second endpoint. This second message may include the phone number(s) of both the calling endpoint and the called endpoint, as well as additional information. At step 212, the second endpoint receives the request to set up a call and may respond by transmitting call media between the first and second endpoints. The method concludes at step 214.

Although the present invention and its advantages have been described in detail, it should be understood that various changes, substitutions, and alterations can be made therein without departing from the spirit and scope of the present invention as defined by the appended claims.

What is claimed is:

1. A call manager operable to:
receive a first setup message transmitted by a first endpoint, the first setup message an attempt by the first endpoint to setup a call with a second endpoint, the setup message sent by the first endpoint to an IP address of the call manager after the first endpoint registered with a gatekeeper, the IP address of the call manager supplied to the first endpoint by the gatekeeper in response to a request by the first endpoint to the gatekeeper for an IP address of the second endpoint; and
attempt to setup the call between the first and second endpoints by transmitting a second setup message to the second endpoint;
wherein after the second setup message is transmitted to the second endpoint, call media is exchanged between the first and second endpoints without the call media flowing through the call manager.

2. The call manager of claim 1, wherein the first and second endpoints comprise IP telephones.

3. The call manager of claim 1, wherein the first and second setup messages each comprise a telephone number of the second endpoint a telephone number of the first endpoint.

4. The call manager of claim 1, further operable to implement one or more call permissions to restrict the ability of a particular endpoint from reaching another endpoint, the call permissions indicating which endpoint is allowed to call with other endpoint.

5. The call manager of claim 1, further operable to determine how calls should be routed based on time.

6. The call manager of claim 1, further operable to provide:
least-cost routing;
calling and called number translation; and
bandwidth controls.

7. A method comprising:
receiving a first setup message transmitted by a first endpoint, the first setup message an attempt by the first endpoint to setup a call with a second endpoint, the setup message sent by the first endpoint to an IP address of a call manager after the first endpoint registered with a gatekeeper, the IP address of the call manager supplied to the first endpoint by the gatekeeper in response to a request by the first endpoint to the gatekeeper for an IP address of the second endpoint; and
by the call manager, attempting to setup the call between the first and second endpoints by transmitting a second setup message to the second endpoint;
wherein after the second setup message is transmitted to the second endpoint, call media is exchanged between the first and second endpoints without the call media flowing through the call manager.

8. The method of claim 7, wherein the first and second endpoints comprise IP telephones.

9. The method of claim 7, wherein the first and second setup messages each comprise a telephone number of the second endpoint a telephone number of the first endpoint.

10. The method of claim 7, wherein the second setup message comprises a telephone number of the second endpoint a telephone number of the first endpoint.

11. The method of claim 7, further comprising implementing one or more call permissions to restrict the ability of a particular endpoint from reaching another endpoint, the call permissions indicating which endpoint is allowed to call with other endpoint.

12. The method of claim 7, further comprising determining how calls should be routed based on time.

13. The method of claim 7, further comprising:
providing least-cost routing;
providing calling and called number translation; and
providing bandwidth controls.

14. Logic encoded in non-transient computer-readable media, the logic operable, when executed by one or more processors, to:
receive a first setup message transmitted by a first endpoint, the first setup message an attempt by the first endpoint to setup a call with a second endpoint, the setup message sent by the first endpoint to an IP address of a call manager after the first endpoint registered with a gatekeeper, the IP address of the call manager supplied to the first endpoint by the gatekeeper in response to a request by the first endpoint to the gatekeeper for an IP address of the second endpoint; and
by the call manager, attempt to setup the call between the first and second endpoints by transmitting a second setup message to the second endpoint;
wherein after the second setup message is transmitted to the second endpoint, call media is exchanged between the first and second endpoints without the call media flowing through the call manager.

15. The logic of claim 14, wherein the first and second endpoints comprise IP telephones.

16. The logic of claim 14, wherein the first and second setup messages each comprise a telephone number of the second endpoint a telephone number of the first endpoint.

17. The logic of claim 14, further operable to implement one or more call permissions to restrict the ability of a particular endpoint from reaching another endpoint, the call permissions indicating which endpoint is allowed to call with other endpoint.

18. The logic of claim 14, further operable to determine how calls should be routed based on time.

19. The logic of claim 14, further operable to provide:
least-cost routing;
calling and called number translation; and
bandwidth controls.

\* \* \* \* \*